March 6, 1928.
I. V. GIRONÉS
1,661,892
CHANGE SPEED MECHANISM
Filed Jan. 2, 1926
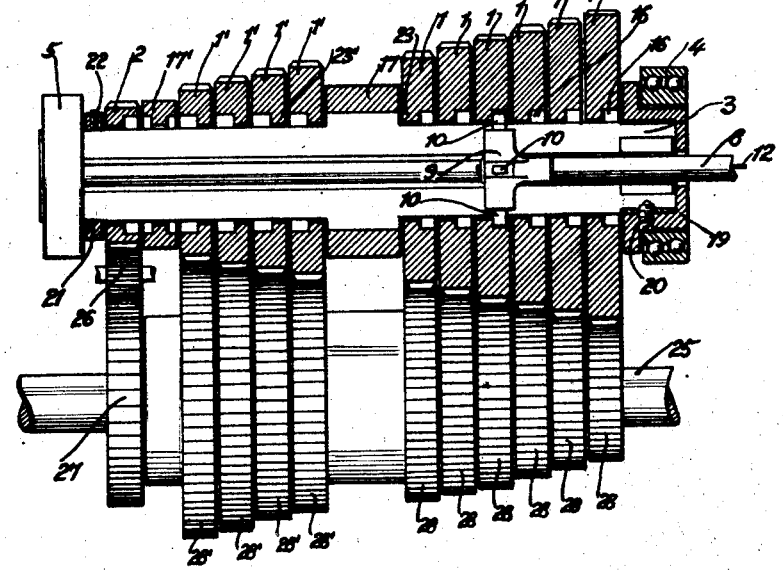
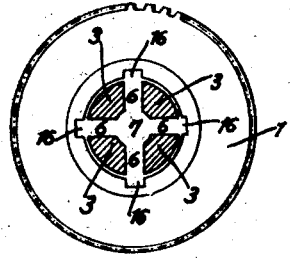
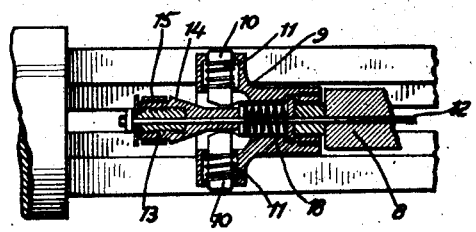
Inventor
J. Vivas Gironés
by
W. E. Evans
Attorney Patented Mar. 6, 1928.

1,661,892

UNITED STATES PATENT OFFICE.

IGNACIO VIVES GIRONÉS, OF BARCELONA, SPAIN.

CHANGE-SPEED MECHANISM.

Application filed January 2, 1926, Serial No. 78,913, and in Spain January 10, 1925.

This invention relates to change speed mechanism adapted for obtaining a great number of speeds, the change being effected with great facility and without shock.

According to the invention a conical train of gears is mounted upon the motor spindle, the elements being always in gear with other corresponding opposed elements which constitute another conical train of gears mounted upon the driven spindle, the gears being mounted free and independent of each other upon the respective spindles, the arrangement however being such that at any instant any one of the gears can be keyed or secured upon the spindle on which it is mounted so that gear and spindle turn together.

The invention is illustrated by way of example in the accompanying drawing applied to speed changing gear for motor vehicles to which purpose it is especially applicable.

In the drawings,

Figure 1 is an elevation of two trains of engaging gears, in which one of the trains of gears is shewn in section.

Figure 2 is a transverse sectional view of a spindle showing one of the gears mounted upon it, and Figure 3 is a longitudinal section on an enlarged scale of the spindle illustrated in Figure 2, shewing the mechanism by means of which the gears are keyed or secured upon the spindle.

As illustrated in the accompanying drawing, the mechanism permits of ten different forward speeds and one reverse speed, and it is constituted of six toothed wheels 1, 1, 1, 1, 1, 1, and four $1^1$, $1^1$, $1^1$ $1^1$, corresponding to the said ten speeds, and another corresponding toothed wheel 2 for the reverse drive, mounted upon the spindle 3 to which the drive is imparted. This spindle is carried in bearings 4 and 5 and at the positions in which the said toothed wheels are supported it is constituted of parallel disposed parts indicated in the sectional view Figure 2, whereby spaces 6, 6, 6, 6, are provided between them, as well as a central conduit 7, which permit the operation of the mechanism for keying or securing the wheels upon the spindle. This mechanism comprises a rod 8 which is adapted to slide the length of the central conduit 7 of the spindle 3, carrying at its extremity the means for keying or securing the wheels upon the spindle. The said means comprise a head 9, which carries four bolts 10, disposed in the manner of a cross, corresponding respectively to the four spaces 6, 6, 6, 6, in the spindle, and subject to the action of springs 11, which tend to maintain them retracted towards the centre of the spindle, whereby the toothed wheels are not keyed or secured upon it.

In order to effect the engagement of any desired toothed wheel with the spindle, there is provided within the central bore of the rod 8, another smaller rod or cable 12, terminating in a head 13 having a conical part 14, adapted outwardly to press the bolts 10, when the head 13 is moved on tension being applied to the cable 12, and with another cylindrical part 15, adapted to maintain the said bolts in the engaged position, their extremities extending into the recesses 16 (Figures 1 and 2) of the corresponding wheel.

The six wheels 1 are separated from the four wheels $1^1$ by a sleeve 17 in which the head 9 passes for the neutral position, and that of the reverse drive is separated from its neighbour $1^1$ by means of a ring $17^1$. The wheels, together with the ring and sleeve are maintained in position at one end by a member 19 screwed upon the spindle 3, and fixed in position by a screw 20, and at the other end, by a ring 21, also screwed upon the spindle and fixed by means of another screw 22.

The recesses 16 of the respective wheels do not extend completely across the wheel, but parts 23 and $23^1$ extend downward, whereby the passage of the bolts from the recess of one wheel to that of the adjacent wheel is prevented, for inasmuch as the speeds of rotation are different, the fracture of the bolts would otherwise result. Thus the movement of the head 9 cannot take place without first operating the cable 12. This can be effected by means connecting the cable or its equivalent with the clutch pedal of the vehicle, and permitting the movement of the head 13 pressed by the spring 18.

The spaces 16 may however extend completely across the wheels if there be placed between the respective wheels a metal disc for preventing the passage of the keying mechanism should the bolts not be withdrawn.

Each of the wheels 1 and $1^1$ is always in gear with the corresponding wheels 28 and 28¹, fixed upon the driven spindle 25 (Figure 1) whereby this latter may rotate at the speed resulting from the relation existing between the wheel keyed or secured to the motor spindle and the wheel in gear with it on the driven spindle 25, which corresponds to the differential. The wheel 2, for the reverse drive will engage with an intermediate pinion 26, and the latter with the wheel 27 fixed to the said spindle 25.

The rod 8 in sliding is operated by means of any suitable transmission which connects the said rod with any operating part such, for example, as a speed changing lever.

When the motor vehicle is set into movement one of the wheels 1 or 1¹ is keyed or secured upon the spindle 3 by means of bolts 10 and consequently it transmits the movement to the driven spindle by means of the corresponding wheel 28 or 28¹ which gears with the said wheel 1 or 1¹. When it is desired to change the speed the keyed wheel is disconnected from the spindle by the operation of the pedal and this movement causing release of the cable 12 causes the head 13 pressed by the springs 17 to slide from the right to the left and the support 15 to release the bolts, these latter passing inwardly into their recesses. Then the rod 8 is so disposed as to slide within the spindle 3 to the extent desired by means of a lever or other operating part provided for this purpose and when it is set into the desired position the motor spindle 3 is connected whereby the bolts 10 partially leave their recesses and key another of the wheels 1 or 1¹ upon the spindle 3 whereby the consequent gearing with the corresponding wheel 28 or 28¹ imparts a different speed to the vehicle from that to which it previously had, or if desired the head 13 may be left in the neutral position if it is desired to stop the vehicle. In this way it is possible to secure a considerable number of speeds by which the speed of the vehicle is adapted to the inclination of the road.

It will be understood that it is possible to render the wheels 28 and 28¹ free upon the driven spindle 25 in providing this spindle similar to the spindle 3 with spaces 6, 6, 6, 6 and with spaces 16, 16, 16, 16. A series of bolts such as 10 may then be disposed to act upon the wheels 28 and 28¹ of the same spindle 25 whereby the heads such as 9 move in the desired manner so that they are always respectively for two wheels of each pair constantly geared together. Then it is not necessary to provide a neutral position 17 because inasmuch as the bolts remain inactive upon the two spindles, the neutral position is produced of itself.

It will be understood that the forms and arrangement of the elements constituting the mechanism may be varied as well as the number of wheels and elements and the means employed for the operation of the movable parts.

It will also be understood that the keying mechanism for effecting the engagement of the wheels upon their spindles may be provided of variable number as well as the attractable bolts which may be operated by means of springs or by other means.

It will furthermore be understood that the mechanism provided according to the invention may be applied as indicated to motor vehicles as well as to motor cycles and generally to other purposes for which change speed mechanism are usually employed.

What I claim is:

1. In change speed gears of the kind in which two series of corresponding graduated gear wheels are disposed upon parallel spindles, the respective gear wheels of the series being constantly in mesh, means by which any one of the series of gear wheels is locked upon its spindle, consisting in combination of a spindle having a co-axial bore, radial slots extending from the periphery of the spindle to the said bore, the said gear wheels having key slots adapted to come into position adjacent the said radial slots in the said spindle, a member adapted to move within the bore of the said spindle, a head carried and rotatable on the end of said member, the said head having parts adapted to slide within the said radial slots, radially disposed keying bolts carried by the said head, means adapted to move the said keying bolts radially outward on the said keying bolts being set in line with the key slots of one of the gear wheels, and means for retracting the said keying bolts, substantially as described.

2. In change speed gears of the kind in which two series of corresponding graduated gear wheels are disposed upon parallel spindles, the respective gear wheels of the series being constantly in mesh, means by which any one of the series of gear wheels is locked upon its spindle, consisting in combination of a spindle having a co-axial bore, radial slots extending from the periphery of the spindle to the said bore, the said gear wheels having key slots adapted to come into position adjacent the said radial slots in the said spindle, a member adapted to move within the bore of the said spindle, a head carried and rotatable on the end of said member, the said head having parts adapted to slide within the said radial slots, radially disposed keying bolts carried by the said head, helical springs adapted to maintain the said keying bolts normally in their innermost position, means adapted to move the said keying bolts radially outward on the said keying bolts being set in line with the key slots of one of the said gear wheels, comprising a centrally disposed transmission member passing through the said member which is adapted to move within the bore of the said spindle, a conical head connected to the end of the said transmission member, said head having a conical face adapted to engage with the inner ends of the said keying bolts, and means comprising a helical spring adapted for moving the said transmission member to move the said conical head outwardly from beneath the inner ends of the said keying bolts, substantially as described.

IGNACIO VIVES GIRONES.